(No Model.) 2 Sheets—Sheet 1.

D. LAKE.
PROCESS OF MAKING PRESSER PADS FOR LASTING MACHINES.

No. 460,377. Patented Sept. 29, 1891.

Witnesses:
R. Schleicher.
Fred D Goodwin.

Inventor:
David Lake
by his Attorneys
Howson & Howson (No Model.) 2 Sheets—Sheet 2.

D. LAKE.
PROCESS OF MAKING PRESSER PADS FOR LASTING MACHINES.

No. 460,377. Patented Sept. 29, 1891.

Witnesses:
R. Schleicher
Fred D. Goodwin

Inventor
David Lake
by his Attorneys
Howson & Howson

United States Patent Office.

DAVID LAKE, OF HORNELLSVILLE, NEW YORK, ASSIGNOR TO THE WHIFFEN-LAKE LASTING MACHINE COMPANY, OF HAMMONTON, NEW JERSEY.

PROCESS OF MAKING PRESSER-PADS FOR LASTING-MACHINES.

SPECIFICATION forming part of Letters Patent No. 460,377, dated September 29, 1891.

Application filed February 16, 1891. Serial No. 381,614. (No model.)

*To all whom it may concern:*

Be it known that I, DAVID LAKE, a citizen of the United States, and a resident of Hornellsville, Steuben county, New York, have invented a Process of Making Presser-Pads for Lasting-Machines, of which the following is a specification.

The object of my invention is to accurately produce at a minimum cost the presser-pads used in lasting-machines for turning in and pressing the edges of an upper against an insole of a boot or shoe. These parts are arranged around the shoe to be lasted and are made in sections, the face contour of each section being different to fit the peculiar line of the last at the base. Heretofore these presser-pads have been cut from either rubber, wood, or metal to the required shape. Consequently a single set of pads has been very expensive and not at all accurate.

By the process which I will now proceed to describe I am enabled to make the presser-pads accurately and at a very moderate cost.

Figure 7:
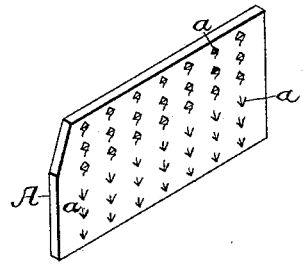
Figure 8:
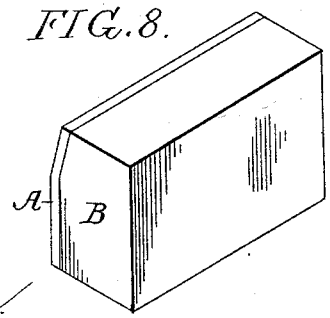
Figure 9:
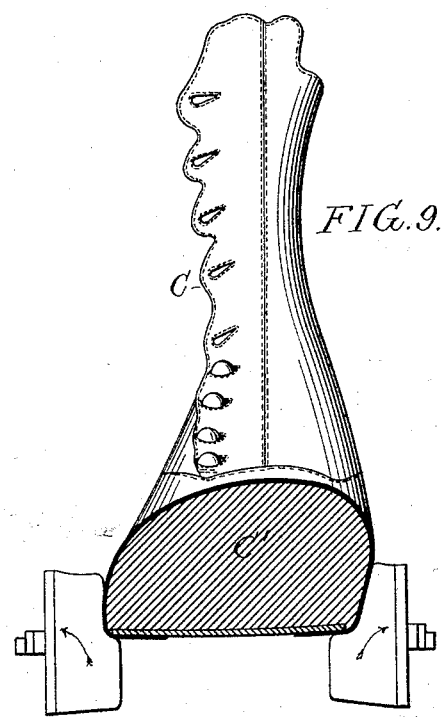
Figure 10:
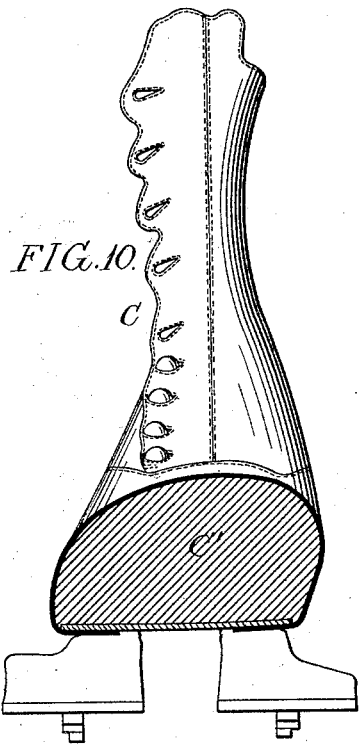
Figure 11:
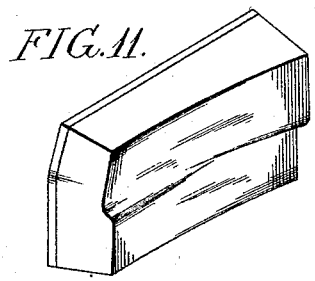

In the accompanying drawings, Figures 1 to 6 are perspective views of a number of presser-pads used in lasting a boot or shoe. Fig. 7 is a perspective view of a pad-plate. Fig. 8 is a perspective view of the plate with molding-wax attached ready to be pressed into shape. Fig. 9 is a view of a lasted shoe in position in a lasting-machine, with the wax pattern receiving the side impression of the lasted shoe. Fig. 10 is a view of wax pattern receiving the bottom impression of the lasted shoe. Fig. 11 is a perspective view of the wax pattern ready to be inserted in the mold; and Figs. 12, 13, 14, and 15 are views showing the different steps in the molding process.

The first step in the process is to prepare the plate A to receive the rubber or equivalent material forming the presser-pad. I prefer to use a presser-pad having a soft-rubber face and a back of hard rubber, which adheres to the prepared surface of the plate A. I form on the face of the plate in the present instance a series of undercut projections $a$, into which the rubber is molded, and when the rubber is hardened it will cling tightly to the plate. The second step of the process is to mount a wax block B on the plate A, it adhering to the roughened surface of the plate. The plate with the wax mounted thereon is then placed in position in the lasting-machine and a perfectly-lasted shoe C, with the last C′, is placed in position on the last-support. The machine is set in motion and the wax blocks are first pressed against the sides of the shoe, as shown in Fig. 9, giving the required side impression, and are in the present instance rolled around in the direction of the arrows, Fig. 9, to the position Fig. 10, thereby giving the corner and bottom impressions.

Figure 1:
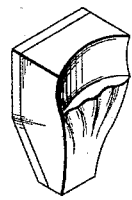
Figure 2:
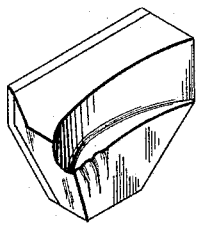

It will be noticed on referring to Figs. 1 and 2 that the bottom impression at the toe gives the overlapping and wrinkling of the leather at this point, thus preventing the bulging of the leather above the sole at the toe.

Figure 12:
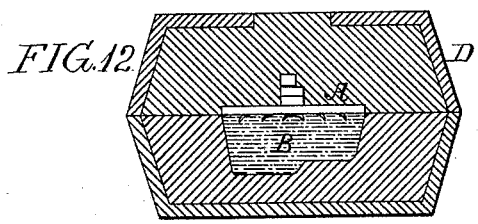
Figure 13:
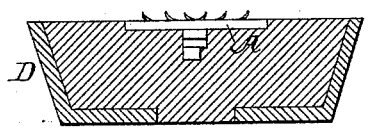
Figure 14:
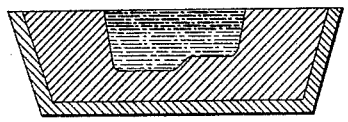
Figure 15:
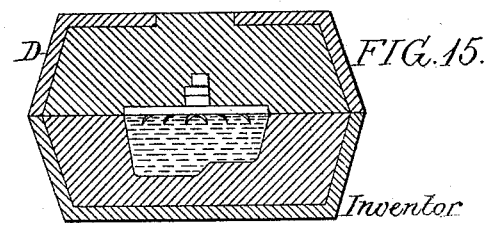

The fourth step in the process is to remove the plate with the wax impression from the lasting-machine and trim the sides of the wax block and place it and the plate in a suitable mold D, Fig. 12, having a body of plaster-of-paris therein. After the plaster-of-paris is set the mold is parted, as in Fig. 13, and the plate and body B of the wax removed, leaving a cavity $d$ of the contour of the wax. The same plate A, or another plate of the same shape, may be inserted into one side of the mold, and the cavity in the opposite mold is filled with rubber or other yielding material, preferably first with a layer of soft rubber and then with a layer of hard rubber, as shown in Fig. 14, after which the two parts of the mold are again clamped together with the plate A, as in Fig. 15, and placed in a vulcanizing-furnace and the rubber vulcanized, after which the plate A and the rubber block or pad are removed from the mold finished and firmly secured together and ready for insertion in the lasting-machine to press the edge of the upper under the last.

Figure 3:
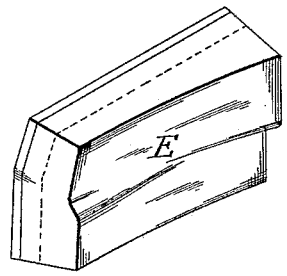
Figure 4:
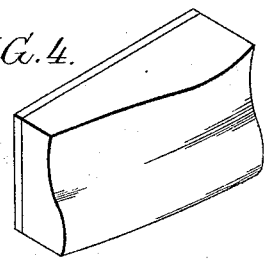
Figure 5:
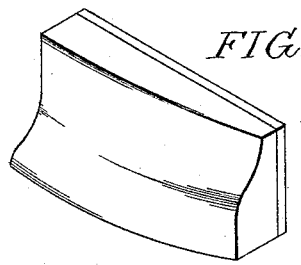
Figure 6:
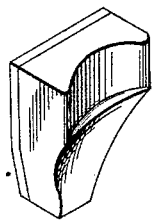

In order to show the different shapes of presser-pads, I have illustrated a number. For instance, Fig. 1 is the toe presser-pad; Fig. 2, one side toe presser-pad; Fig. 3, the ball presser-pad; Fig. 4, the inside shank presser-pad; Fig. 5, the outside presser-pad, and Fig. 6 the heel presser-pad. These pads differ with each size and shape of shoe.

I claim as my invention—

1. The process of making presser-pads for lasting-machines, said process consisting in first mounting wax on a plate; second, placing the plate with the wax in the lasting-machine; third, pressing the waxed plate against a lasted shoe, whereby an impression is obtained; fourth, making a cast from said pressed wax and plate, removing the wax from the plate and mold, filling said mold with rubber, adjusting a plate provided with a holding-surface in said mold, and, finally, vulcanizing the rubber, whereby the rubber is firmly secured to the plate and having a face of the contour of the shoe, substantially as described.

2. The process herein described of forming the presser-pads of lasting-machines, said process consisting in making a mold of the form of the pad, filling said mold first with a layer of soft rubber, then with a layer of hard rubber, placing a backing-plate in the mold, said backing-plate having cavities, and then vulcanizing the rubber, whereby the soft or yielding face is held to the plate through the medium of the hard rubber, substantially as described.

In testimony whereof I have signed my name to this specification in the presence of two subscribing witnesses.

DAVID LAKE.

Witnesses:
H. F. REARDON,
HENRY HOWSON.